United States Patent
Krajewski et al.

(10) Patent No.: US 10,097,639 B2
(45) Date of Patent: Oct. 9, 2018

(54) ZERO TOUCH ATTACHMENT OF DEVICES TO A SPB NETWORK

(71) Applicant: Avaya Inc., Santa Clara, CA (US)

(72) Inventors: Keith Krajewski, Billerica, MA (US); Deborah Fitzgerald, Acton, MA (US); Carl Keene, Groveland, MA (US); Srikanth Keesara, Tewksbury, MA (US)

(73) Assignee: AVAYA INC., Santa Clara, CA (US)

( * ) Notice: Subject to any disclaimer, the term of this patent is extended or adjusted under 35 U.S.C. 154(b) by 3 days.

(21) Appl. No.: 15/478,175

(22) Filed: Apr. 3, 2017

(65) Prior Publication Data
US 2017/0289944 A1    Oct. 5, 2017

Related U.S. Application Data

(60) Provisional application No. 62/318,176, filed on Apr. 4, 2016.

(51) Int. Cl.
*H04L 12/28* (2006.01)
*H04L 29/08* (2006.01)
*H04L 12/733* (2013.01)
*H04W 48/16* (2009.01)
*H04L 29/06* (2006.01)

(52) U.S. Cl.
CPC ............ *H04L 67/12* (2013.01); *H04L 45/122* (2013.01); *H04L 67/28* (2013.01); *H04L 67/42* (2013.01); *H04W 48/16* (2013.01)

(58) Field of Classification Search
CPC ....... H04L 67/12; H04L 45/122; H04L 67/42; H04L 67/28; H04L 65/00; H04L 45/00; H04L 45/02; H04L 45/04; H04W 48/16
USPC .................. 370/351, 360, 389, 401, 402
See application file for complete search history.

(56) References Cited

U.S. PATENT DOCUMENTS

2015/0271017 A1* 9/2015 Seligson ............. H04L 41/0813
                                                                  370/254

* cited by examiner

*Primary Examiner* — Brenda H Pham
(74) *Attorney, Agent, or Firm* — IP Spring

(57) ABSTRACT

Methods, systems and computer readable media for zero touch attachment of devices, such as Internet of Things (IoT) devices, to an SPB network are described.

20 Claims, 3 Drawing Sheets

ZERO TOUCH ATTACHMENT OF DEVICES TO A SPB NETWORK

RELATED APPLICATIONS

This application claims priority to U.S. Provisional Application No. 62/318,176, entitled "Zero Touch Attachment of IoT Devices to a Fabric Enabled Network", and filed on Apr. 4, 2016, which is incorporated herein by reference in its entirety.

FIELD

Embodiments relate generally to computer networks, and more particularly, to methods, systems and computer readable media for zero touch attachment of devices (e.g., Internet of Things (IoT) devices, HVAC/thermostats, medical devices, security devices (e.g., access control, cameras, etc.), hypervisors, etc.) to a shortest path bridging (SPB or IEEE 802.1aq) network.

BACKGROUND

There is an ever increasing presence of a new class of Internet protocol (IP) enabled devices in enterprise environments. Typically, end user devices included devices such as cell phones, notebook computers, tablet computers, etc. which may need access to the general enterprise data network with either guest or employee privileges. The new class of end user devices, e.g., Internet of Things (IoT) devices, can include surveillance cameras, temperature sensors, smoke detectors, fire alarms, appliances, access control devices (e.g., door locks, etc.), equipment monitoring devices, environmental control devices, etc., which can include IP-based communication to report the information that they gather to other systems via a data network. In some real world deployment scenarios, these IoT devices may be deployed by personnel that may not be familiar with data networking or IP.

Consequently, it may be important in such environments to be able to deploy these devices and automatically connect the devices to a network and configure the devices for network communications with little or no upfront configuration (so called zero touch attachment) on the devices beyond the default settings that these devices are shipped with from the factory. It can also be important that the set of network ports that these devices could be connected to have very little static port configurations for adding the ports to a logical network. At the completion of onboarding of these devices into the network—they are supposed to end-up on the logical network (alternately referred to as a virtual private network (VPN) or a virtual services network (VSN)) which serves the real application for which the device is deployed. For example—surveillance cameras are supposed to end-up in the surveillance network.

Currently there may be little or no capability provide for which this operation is entirely zero touch from a device and switch point of view. SPB network attach procedures, to the extent they are currently defined, may be helpful when the device performing the SPB network attach signaling already has network management connectivity. For example, a wireless access point (AP) may require connectivity to and may be controlled by its management applications (WOS) while it signals an SPB attach (SPBA) requesting attachment to additional VSNs beyond the one used for its network management. Similarly an open network adapter (ONA), such as that made by Avaya, may first require connectivity to an software define network (SDN) controller before the ONA learns of the SPBA bindings that the ONA is supposed to signal. What has not fully been addressed in the above conventional systems is a need to automate even the initial step of the device getting its management plane connectivity in an SPB network.

Embodiments were conceived in light of the above mentioned needs, problems and/or limitations, among other things.

SUMMARY

Some implementations can include a method comprising receiving, at a shortest path bridging attach system, a first shortest path bridging attach request message from a device, the first shortest path bridging attach request message including a request to map untagged network traffic from the device to a bootstrap service identifier (or I-SID), and mapping, at the shortest path bridging attach system, untagged traffic from the device to the bootstrap I-SID. The method can also include establishing, at the shortest path bridging attach system, communication between the device and a bootstrap application associated with the bootstrap I-SID, and sending, from the shortest path bridging attach system, direction to the device from the bootstrap application for the device to join an actual I-SID.

The method can further include receiving, at the shortest path bridging attach system, a second shortest path bridging attach request message from the device, the second shortest path bridging attach request message including a request to map untagged network traffic from the device to the actual I-SID, wherein the actual I-SID is associated with a logical network segment dedicated to the device, and mapping, at the shortest path bridging attach system, untagged traffic from the device to the actual I-SID and isolating network data sent and received by device within the logical network segment dedicated to the device.

The method can also include deploying the bootstrap application to the shortest path bridging attach system and logically connecting the bootstrap application to the bootstrap I-SID. The method can further include configuring the bootstrap application with the actual I-SID.

The device can include an Internet of Things (IoT) device.

In some implementations, the device can include a shortest path bridging client, and wherein the method includes directly connecting the shortest path bridging attach system to the device via the shortest path bridging client. Communications between the device and the shortest path bridging attach system can pass through a shortest path bridging attach proxy.

In some implementations, when the device does not include a capability to directly communicate with the shortest path bridging attach system, communications and attachment operations between the device and the shortest path bridging attach system can be performed via a shortest path bridging client configured to communicate with both the device and the shortest path bridging attach system, the shortest path bridging attach client being logically connected between the device and the shortest path bridging attach system.

Some implementations can include a shortest path bridging attach system comprising one or more processors, and a nontransitory computer readable medium having stored there on software instructions that, when executed by the one or more processors, cause the one or more processors to perform operations. The operations can include receiving, at the shortest path bridging attach system, a first shortest path bridging attach request message from a device, the first shortest path bridging attach request message including a request to map untagged network traffic from the device to a bootstrap I-SID, and mapping, at the shortest path bridging attach system, untagged traffic from the device to the bootstrap I-SID. The operations can also include establishing, at the shortest path bridging attach system, communication between the device and a bootstrap application associated with the bootstrap I-SID, and sending, from the shortest path bridging attach system, direction to the device from the bootstrap application for the device to join an actual I-SID.

The operations can further include receiving, at the shortest path bridging attach system, a second shortest path bridging attach request message from the device, the second shortest path bridging attach request message including a request to map untagged network traffic from the device to the actual I-SID, wherein the actual I-SID is associated with a logical network segment dedicated to the device, and mapping, at the shortest path bridging attach system, untagged traffic from the device to the actual I-SID and isolating network data sent and received by device within the logical network segment dedicated to the device.

The operations can also include deploying the bootstrap application to the shortest path bridging attach system and logically connecting the bootstrap application to the bootstrap I-SID. The operations can further include configuring the bootstrap application with the actual I-SID.

The device can include an Internet of Things (IoT) device. In some implementations, the device can include a shortest path bridging client, and wherein the operations can include directly connecting the shortest path bridging attach system to the device via the shortest path bridging client. Communications between the device and the shortest path bridging attach system can pass through a shortest path bridging attach proxy.

In some implementations, when the device does not include a capability to directly communicate with the shortest path bridging attach system, communications and attachment operations between the device and the shortest path bridging attach system are performed via a shortest path bridging client configured to communicate with both the device and the shortest path bridging attach system, the shortest path bridging attach client being logically connected between the device and the shortest path bridging attach system.

Some implementations can include a nontransitory computer readable medium having stored there on software instructions that, when executed by one or more processors, cause the one or more processors to perform operations. The operations can include receiving, at the shortest path bridging attach system, a first shortest path bridging attach request message from a device, the first shortest path bridging attach request message including a request to map untagged network traffic from the device to a bootstrap I-SID, and mapping, at the shortest path bridging attach system, untagged traffic from the device to the bootstrap I-SID. The operations can also include establishing, at the shortest path bridging attach system, communication between the device and a bootstrap application associated with the bootstrap I-SID, and sending, from the shortest path bridging attach system, direction to the device from the bootstrap application for the device to join an actual I-SID.

The operations can further include receiving, at the shortest path bridging attach system, a second shortest path bridging attach request message from the device, the second shortest path bridging attach request message including a request to map untagged network traffic from the device to the actual I-SID, wherein the actual I-SID is associated with a logical network segment dedicated to the device, and mapping, at the shortest path bridging attach system, untagged traffic from the device to the actual I-SID and isolating network data sent and received by device within the logical network segment dedicated to the device.

The operations can also include deploying the bootstrap application to the shortest path bridging attach system and logically connecting the bootstrap application to the bootstrap I-SID. The operations can further include configuring the bootstrap application with the actual I-SID.

The device can include an Internet of Things (IoT) device. In some implementations, the device can include a shortest path bridging client, and wherein the operations can include directly connecting the shortest path bridging attach system to the device via the shortest path bridging client. Communications between the device and the shortest path bridging attach system can pass through a shortest path bridging attach proxy.

In some implementations, when the device does not include a capability to directly communicate with the shortest path bridging attach system, communications and attachment operations between the device and the shortest path bridging attach system are performed via a shortest path bridging client configured to communicate with both the device and the shortest path bridging attach system, the shortest path bridging attach client being logically connected between the device and the shortest path bridging attach system.

DETAILED DESCRIPTION

In general, some implementations include features that permit an IoT device (or other device) that may not be SPB network capable to attach itself (or connect) to an SPB network (e.g., an SPB network with auto attach features such as Avaya Fabric Attach) without requiring upfront static configurations on the device or the network that it connects to. Also, the auto attachment of the device to the SPB can also include placing the device into its own logical network segment (e.g., VSN) such that the data and/or control signals associated with the device are segmented and separated from the data and/or control signals of other devices.

Some implementations may not require any manual configuration to be performed on a device or any static configuration to be performed on the switches to pick I-SID values based on device types. Attachment and I-SID configuration is handled automatically between the device and an onboarding application (e.g., the zero touch attachment application as described herein). The Actual I-SID value in the Bootstrap Application may have to be configured prior to IoT devices being connected and automatically assigned to the correct I-SID. Some implementations can be configured to automatically place a device connecting to the SPB network into a VSN (via an associated I-SID) that isolates the device data from other data that is carried across the SPB network. Further, some implementations provide an ability to switch a device connection between a control VSN and a data VSN by simply switching the I-SID, thus providing security and flexibility to a user of the device without requiring the user to perform manual configuration or attachment tasks.

Some implementations can include a Bootstrap Application connected to a Bootstrap I-SID. During the zero touch attachment, the IoT device may switch its I-SID in the SPBA requests (e.g. from bootstrap I-SID to actual I-SID) and reinitiate DHCP/DNS procedures between the switching of I-SID values.

Figure 1:
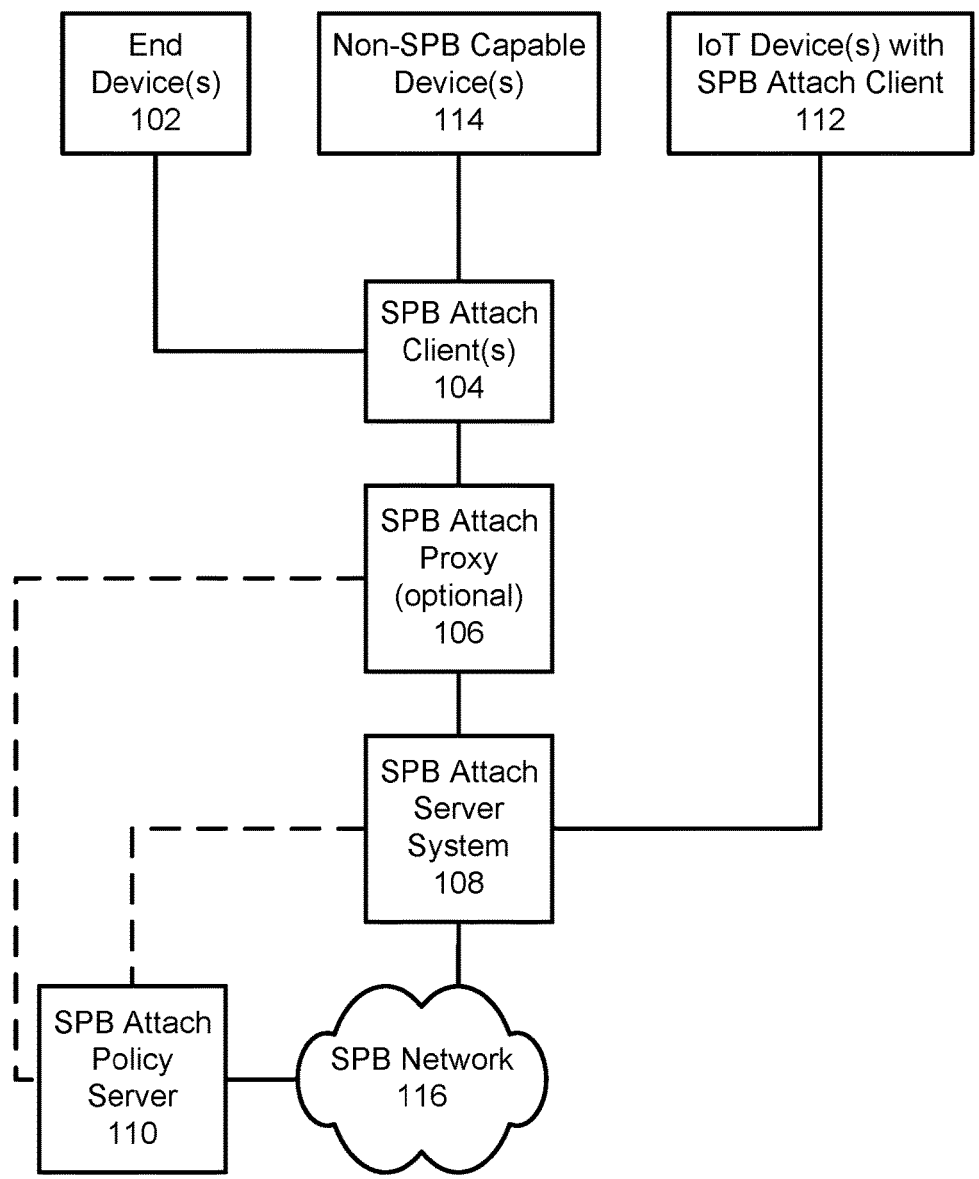
FIG. 1 is a diagram of an example SPB network environment in accordance with at least one implementation.

FIG. 1 is a diagram of an example SPB network environment 100 having SPB auto attach functionality in accordance with at least one implementation. The environment 100 can include one or more end devices 102 (e.g., smartphones, laptops, desktops, tablets, etc.), one or more non-SPB-capable end devices 114, and/or one or more IoT devices having an SPB attach client 112. The environment 100 can include an attachment system (e.g., Avaya Fabric Attach or other auto attach system such as those defined by IEEE 802.1Qcj) that includes one or more SPB attach clients 104, an optional SPB attach proxy 106, an SPB attach server 108 and an SPB attach policy server 110. End devices 102 and non-SPB capable devices may connect to the SPB attach server system 108 via an SPB attach client 104. An IoT device that includes an SPB client can connect directly to the SPB attach server system 108 without the need for the SPB attach client 104. The SPB attach proxy 106 is an optional proxy that can be configured between devices (e.g., 102, 112, 114) and the SPB attach server system 108.

The SPB attach (SPB) system (e.g., 104-110) can be configured to provide zero touch attachment for a device (e.g., IoT device 112, end device 110, etc.) to an SPB network 116 as described herein.

Figure 2:
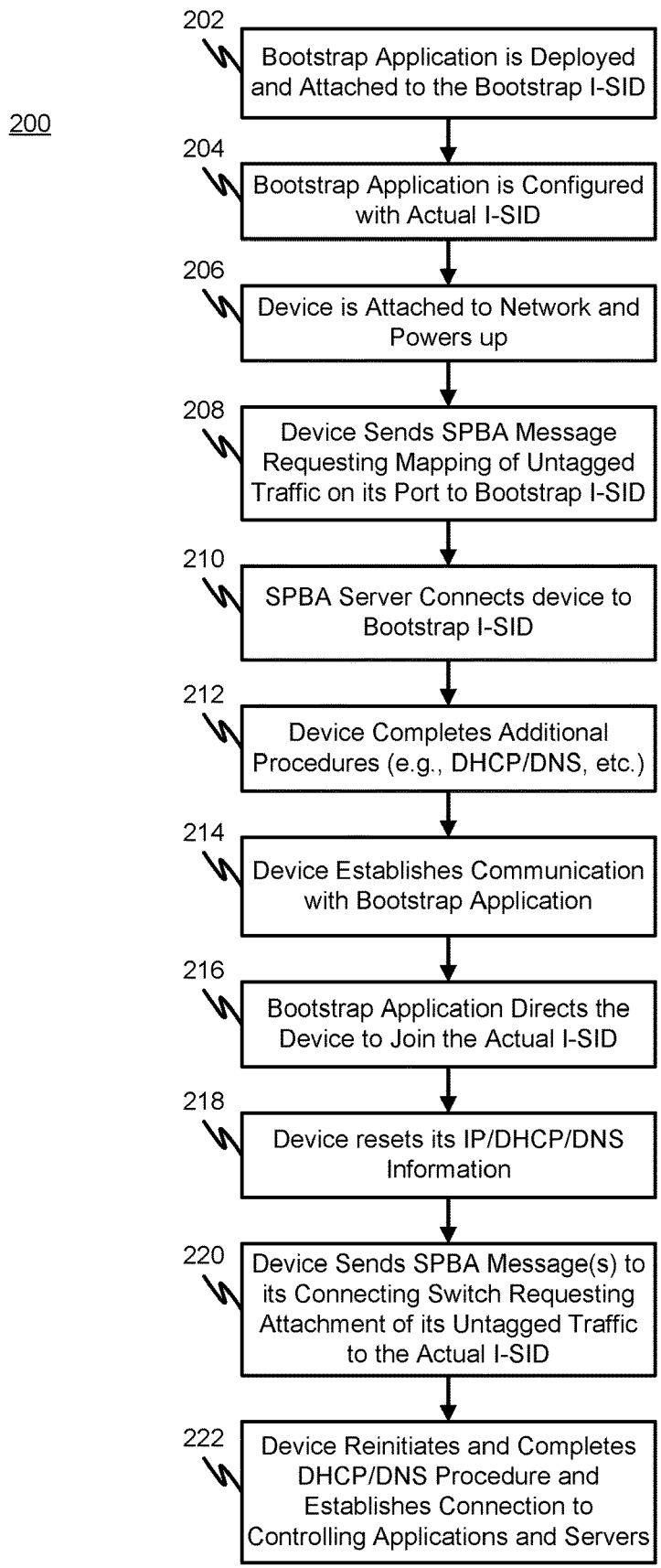
FIG. 2 is a flow chart of an example method of providing zero touch attachment of a device to an SPB network in accordance with at least one implementation.

FIG. 2 is a flow chart of an example method 200 for zero touch attachment of a device (e.g., an IoT device) to an SPB network in accordance with at least one implementation. Processing begins at 202 where a Bootstrap Application is deployed to an SPB attach server (e.g., 108) to help onboard the device (e.g., 102, 112, and/or 114). This bootstrap application could be device type specific. For example, a first bootstrap application could be deployed to support surveillance cameras and a second different bootstrap application could be deployed to support temperature sensors. The Bootstrap Application can be attached to a Bootstrap I-SID (this attachment itself could be automated using SPBA). Processing continues to 204.

At 204, the Bootstrap Application is programmed (or configured) with the Actual I-SID that a particular type of IoT device is supposed to be attached to following completion of the zero touch attachment process described herein. The actual I-SID can be associated with a logical network segment (e.g., VPN or VSN) that can be dedicated to the device or correspond to a category of devices that the device belongs to. Processing continues to 206.

At 206, a device (e.g., an IoT device) is attached to the network and powers up. For example, the device may use Power over Ethernet (PoE) from the switch that it is connected to. Processing continues to 208.

At 208, the device sends an SPB attach (SPBA) message requesting the mapping of untagged-traffic on its network attached port to the bootstrap I-SID value. This I-SID value can be fixed at the device factory based on device type. The bootstrap I-SID value may not be changeable in the field. Processing continues to 210.

At 210, the SPB network attachment system (e.g., Fabric Attach server or other SPB network attach server) can use standard procedures to connect the device to the bootstrap I-SID. Processing continues to 212.

At 212, the device completes additional procedures to establish network communications (e.g., DHCP/DNS). Processing continues to 214.

At 214, the device establishes communications with the bootstrap application. The bootstrap application can reside on a client, proxy or server within the auto attach system (e.g., 104-110) or elsewhere in the SPB network. Processing continues to 216.

At 216, the bootstrap application can send the device the actual I-SID value and directs the device to join the actual I-SID. Processing continues to 218.

At 218, the device resets (or changes) any IP/DHCP/DNS information that needs to be changed in preparation for joining the actual I-SID. Processing continues to 220.

At 220, the device sends SPBA messages to its connecting switch requesting attachment of its untagged traffic to the actual I-SID. This results in the device being connected to the actual I-SID that it is supposed to be operating on following the zero touch attachment process. The actual I-SID can be associated with a VSN (or VPN) for the device. Thus, the zero touch onboarding described herein can onboard devices automatically and connect the devices with corresponding logical network segments for data and/or control such that the data and/or control signals for the onboarded device can be segmented from the data and/or control signals for other devices. Processing continues to 222.

At 222, the device reinitiates and completes DHCP/DNS procedures and establishes connectivity to the actual I-SID and, in turn, to the controlling applications and servers for the device.

It will be appreciated that 202-222 can be repeated in whole or in part.

Figure 3:
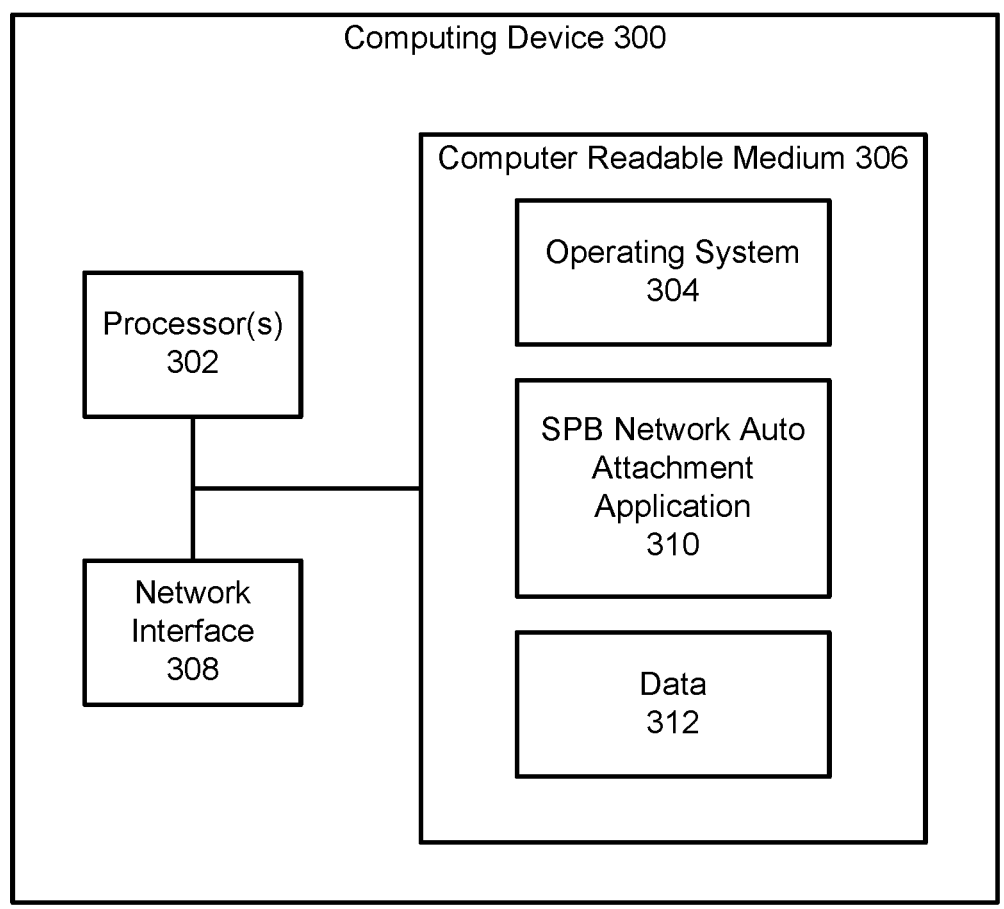
FIG. 3 is a diagram of an example computing device configured for providing zero touch attachment of a device to an SPB network in accordance with at least one implementation.

FIG. 3 is a diagram of an example computing device 300 in accordance with at least one implementation. The computing device 300 includes one or more processors 302, nontransitory computer readable medium 306 and network interface 308. The computer readable medium 306 can include an operating system 304, an SPB network device attachment application 310 having zero touch attachment capability and a data section 312 (e.g., for storing a bootstrap I-SID, an actual I-SID, etc.).

In operation, the processor 302 may execute the application 310 stored in the computer readable medium 306. The application 310 can include software instructions that, when executed by the processor, cause the processor to perform operations for zero touch attachment of a device (e.g., an Internet of Things (IoT) device) to an SPB network in accordance with the present disclosure (e.g., performing one or more of 202-222 described above).

The application program 310 can operate in conjunction with the data section 312 and the operating system 304.

In some implementations, a non-SPB attach capable device (e.g., an Mill machine) can be indirectly auto attached according to the procedure described herein to an SPB network through an SPBA client (e.g., the Avaya Open Network Adapter or the like).

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for zero touch attachment of devices to an SPB network.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising:
receiving, at a shortest path bridging attach system, a first shortest path bridging attach request message from a device, the first shortest path bridging attach request message including a request to map untagged network traffic from the device to a bootstrap I-SID;
mapping, at the shortest path bridging attach system, untagged traffic from the device to the bootstrap I-SID;
establishing, at the shortest path bridging attach system, communication between the device and a bootstrap application associated with the bootstrap I-SID;
sending, from the shortest path bridging attach system, direction to the device from the bootstrap application for the device to join an actual I-SID;
receiving, at the shortest path bridging attach system, a second shortest path bridging attach request message from the device, the second shortest path bridging attach request message including a request to map untagged network traffic from the device to the actual I-SID, wherein the actual I-SID is associated with a logical network segment dedicated to the device; and
mapping, at the shortest path bridging attach system, untagged traffic from the device to the actual I-SID and isolating network data sent and received by device within the logical network segment dedicated to the device.

2. The method of claim 1, further comprising:
deploying the bootstrap application to the shortest path bridging attach system and logically connecting the bootstrap application to the bootstrap I-SID.

3. The method of claim 2, further comprising: configuring the bootstrap application with the actual I-SID.

4. The method of claim 1, wherein the device includes one of an Internet of Things (IoT) device.

5. The method of claim 1, wherein the device includes a shortest path bridging client, and wherein the method includes directly connecting the shortest path bridging attach system to the device via the shortest path bridging client.

6. The method of claim 1, wherein communications between the device and the shortest path bridging attach system pass through a shortest path bridging attach proxy.

7. The method of claim 1, wherein the device does not include a capability to directly communicate with the shortest path bridging attach system, and wherein communications and attachment operations between the device and the shortest path bridging attach system are performed via a shortest path bridging client configured to communicate with both the device and the shortest path bridging attach system, the shortest path bridging attach client being logically connected between the device and the shortest path bridging attach system.

8. A shortest path bridging attach system comprising:
one or more processors; and
a nontransitory computer readable medium having stored there on software instructions that, when executed by the one or more processors cause the one or more processors to perform operations including:
receiving, at the shortest path bridging attach system, a first shortest path bridging attach request message from a device, the first shortest path bridging attach request message including a request to map untagged network traffic from the device to a bootstrap I-SID;
mapping, at the shortest path bridging attach system, untagged traffic from the device to the bootstrap I-SID;
establishing, at the shortest path bridging attach system, communication between the device and a bootstrap application associated with the bootstrap I-SID;
sending, from the shortest path bridging attach system, direction to the device from the bootstrap application for the device to join an actual I-SID;
receiving, at the shortest path bridging attach system, a second shortest path bridging attach request message from the device, the second shortest path bridging attach request message including a request to map untagged network traffic from the device to the actual I-SID, wherein the actual I-SID is associated with a logical network segment dedicated to the device; and
mapping, at the shortest path bridging attach system, untagged traffic from the device to the actual I-SID and isolating network data sent and received by device within the logical network segment dedicated to the device.

9. The shortest path bridging attach system of claim 8, wherein the operations further include:
deploying the bootstrap application to the shortest path bridging attach system and logically connecting the bootstrap application to the bootstrap I-SID.

10. The shortest path bridging attach system of claim 9, wherein the operations further include: configuring the bootstrap application with the actual I-SID.

11. The shortest path bridging attach system of claim 8, wherein the device includes an Internet of Things (IoT) device.

12. The shortest path bridging attach system of claim 8, wherein the device includes a shortest path bridging client, and wherein the operations include directly connecting the shortest path bridging attach system to the device via the shortest path bridging client.

13. The shortest path bridging attach system of claim 8, wherein communications between the device and the shortest path bridging attach system pass through a shortest path bridging attach proxy.

14. The shortest path bridging attach system of claim 8, wherein the device does not include a capability to directly communicate with the shortest path bridging attach system, and wherein communications and attachment operations between the device and the shortest path bridging attach system are performed via a shortest path bridging client configured to communicate with both the device and the shortest path bridging attach system, the shortest path bridging attach client being logically connected between the device and the shortest path bridging attach system.

15. A nontransitory computer readable medium having stored there on software instructions that, when executed by one or more processors, cause the one or more processors to perform operations including:
receiving, at a shortest path bridging attach system, a first shortest path bridging attach request message from a device, the first shortest path bridging attach request message including a request to map untagged network traffic from the device to a bootstrap I-SID;
mapping, at the shortest path bridging attach system, untagged traffic from the device to the bootstrap I-SID;
establishing, at the shortest path bridging attach system, communication between the device and a bootstrap application associated with the bootstrap I-SID;
sending, from the shortest path bridging attach system, direction to the device from the bootstrap application for the device to join an actual I-SID;
receiving, at the shortest path bridging attach system, a second shortest path bridging attach request message from the device, the second shortest path bridging attach request message including a request to map untagged network traffic from the device to the actual I-SID, wherein the actual I-SID is associated with a logical network segment dedicated to the device; and
mapping, at the shortest path bridging attach system, untagged traffic from the device to the actual I-SID and isolating network data sent and received by device within the logical network segment dedicated to the device.

16. The nontransitory computer readable medium of claim 15, wherein the operations further include:
deploying the bootstrap application to the shortest path bridging attach system and logically connecting the bootstrap application to the bootstrap I-SID.

17. The nontransitory computer readable medium of claim 16, wherein the operations further include: configuring the bootstrap application with the actual I-SID.

18. The nontransitory computer readable medium of claim 15, wherein the device includes a shortest path bridging client, and wherein the operations include directly connecting the shortest path bridging attach system to the device via the shortest path bridging client.

19. The nontransitory computer readable medium of claim 15, wherein communications between the device and the shortest path bridging attach system pass through a shortest path bridging attach proxy.

20. The nontransitory computer readable medium of claim 15, wherein the device does not include a capability to directly communicate with the shortest path bridging attach system, and wherein communications and attachment operations between the device and the shortest path bridging attach system are performed via a shortest path bridging client configured to communicate with both the device and the shortest path bridging attach system, the shortest path bridging attach client being logically connected between the device and the shortest path bridging attach system.

\* \* \* \* \*